US009406148B2

(12) United States Patent
Zhu et al.

(10) Patent No.: US 9,406,148 B2
(45) Date of Patent: Aug. 2, 2016

(54) IMAGE PROCESSING METHOD AND APPARATUS, AND SHOOTING TERMINAL

(71) Applicant: Huawei Device Co., Ltd., Shenzhen (CN)

(72) Inventors: Congchao Zhu, Beijing (CN); Gang Chen, Beijing (CN); Hao Wang, Beijing (CN); Jia Qi, Xi'an (CN); Wei Luo, Shanghai (CN); Cheng Du, Beijing (CN); Bin Deng, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 0 days.

(21) Appl. No.: 14/575,703

(22) Filed: Dec. 18, 2014

(65) Prior Publication Data
US 2015/0104100 A1   Apr. 16, 2015

Related U.S. Application Data

(63) Continuation of application No. PCT/CN2014/070079, filed on Jan. 3, 2014.

(30) Foreign Application Priority Data

Jan. 7, 2013 (CN) .......................... 2013 1 0005051

(51) Int. Cl.
*G06K 9/00* (2006.01)
*G06T 7/40* (2006.01)
(Continued)

(52) U.S. Cl.
CPC .................. *G06T 7/408* (2013.01); *G06T 5/001* (2013.01); *G06T 5/002* (2013.01); *G06T 5/003* (2013.01);
(Continued)

(58) Field of Classification Search
CPC ......... G06T 5/001; G06T 5/002; G06T 5/003; G06T 5/007; G06T 5/20; G06T 7/408; G06T 2207/10024; G06T 2207/20024; G06T 2207/20182; G06T 2207/10004; H04N 5/217; H04N 5/232

USPC .............. 382/199, 266, 167; 348/241, 333.05
See application file for complete search history.

(56) References Cited

U.S. PATENT DOCUMENTS 6,269,182 B1 * 7/2001 Ishii ......................... G01J 3/51
356/418
6,529,630 B1 * 3/2003 Kinjo ................. G06K 9/00228
382/118

(Continued)

FOREIGN PATENT DOCUMENTS

CN        1794783 A     6/2006
CN      101119448 A     2/2008
(Continued)

OTHER PUBLICATIONS

Horiuchi, T., et al., "Adaptive Filtering for Color Image Sharpening and Denoising," 14th International Conference on Image Analysis and Processing, Sep. 10-13, 2007, 6 pages.

(Continued)

*Primary Examiner* — Mekonen Bekele
(74) *Attorney, Agent, or Firm* — Conley Rose, P.C.; Grant Rodolph

(57) ABSTRACT

An image processing method and apparatus, and a shooting terminal, where the method includes acquiring a to-be-processed image that is shot but is not image-processed; extracting shooting characteristic information of the to-be-processed image; performing image processing on the to-be-processed image according to the shooting characteristic information. In this way, after acquiring a to-be-processed image that is shot, a shooting terminal uses shooting characteristic information of the to-be-processed image as a basis of adaptive processing of the image, and performs processing on each to-be-processed image according to shooting characteristic information of each to-be-processed image, so that the quality of an image that is obtained after being processed by the shooting terminal can be adaptively improved.

20 Claims, 5 Drawing Sheets

(51) Int. Cl.
  *H04N 5/232* (2006.01)
  *H04N 5/217* (2011.01)
  *G06T 5/00* (2006.01)
  *G06T 5/20* (2006.01)
(52) U.S. Cl.
  CPC . *G06T 5/007* (2013.01); *G06T 5/20* (2013.01); *H04N 5/217* (2013.01); *H04N 5/232* (2013.01); *G06T 2207/10004* (2013.01); *G06T 2207/10024* (2013.01); *G06T 2207/20024* (2013.01); *G06T 2207/20182* (2013.01)

(56) References Cited

U.S. PATENT DOCUMENTS

| | | | |
|---|---|---|---|
| 6,757,442 | B1 | 6/2004 | Avinash |
| 8,154,629 | B2 * | 4/2012 | Kanemitsu ............... G06K 9/40 348/241 |
| 9,019,395 | B2 * | 4/2015 | Masukawa ................ G06T 3/40 348/231.1 |
| 2005/0157189 | A1 | 7/2005 | Sambongi |
| 2006/0013501 | A1 | 1/2006 | Tamura |
| 2006/0013503 | A1 | 1/2006 | Kim |
| 2006/0132642 | A1 | 6/2006 | Hosaka et al. |
| 2008/0027994 | A1 | 1/2008 | Guan |
| 2008/0031538 | A1 | 2/2008 | Jiang et al. |
| 2010/0066868 | A1 * | 3/2010 | Shohara ................... G06K 9/40 348/241 |
| 2011/0229019 | A1 | 9/2011 | Batur et al. |
| 2013/0202220 | A1 * | 8/2013 | Takeshita ............. H04N 13/026 382/264 |
| 2013/0208165 | A1 * | 8/2013 | An ..................... H04N 5/23293 348/333.05 |
| 2013/0314402 | A1 * | 11/2013 | Furumura .............. G03B 35/02 345/419 |
| 2015/0348251 | A1 * | 12/2015 | Wu ....................... G06T 7/0002 348/701 |

FOREIGN PATENT DOCUMENTS

| | | |
|---|---|---|
| CN | 101502097 A | 8/2009 |
| CN | 102547117 A | 7/2012 |
| CN | 103067661 A | 4/2013 |

OTHER PUBLICATIONS

Wu, J., et al., "An Efficient Method for Enhancing High-Contrast Digital Photos Automatically," Jun. 2006, 6 pages.
Huang, Y., et al., "Noise Reduction Using Enhanced Bilateral Filter," vol. 12, No. 4, Jan. 2006, pp. 46-53.
Foreign Communication From a Counterpart Application, European Application No. 14735127.4, Extended European Search Report dated Jul. 17, 2015, 10 pages.
Partial English Translation and Abstract of Chinese Patent Application No. CN103067661A, Jan. 27, 2015, 4 pages.
Partial English Translation and Abstract of Chinese Patent Application No. CN101119448A, Jan. 27, 2015, 12 pages.
Partial English Translation and Abstract of Chinese Patent Application No. CN102547117A, Jan. 27, 2015, 4 pages.
Foreign Communication From a Counterpart Application, PCT Application No. PCT/CN2014/070079, English Translation of International Search Report dated Apr. 3, 2014, 3 pages.
Foreign Communication From a Counterpart Application, PCT Application No. PCT/CN2014/070079, Written Opinion dated Apr. 3, 2014, 6 pages.

* cited by examiner

IMAGE PROCESSING METHOD AND APPARATUS, AND SHOOTING TERMINAL

CROSS-REFERENCE TO RELATED APPLICATIONS

This application is a continuation of International Application No. PCT/CN2014/070079, filed on Jan. 3, 2014, which claims priority to Chinese Patent Application No. 201310005051.9, filed on Jan. 7, 2013, both of which are hereby incorporated by reference in their entireties.

TECHNICAL FIELD

Embodiments of the present invention relate to image processing technologies, and in particular, to an image processing method and apparatus, and a shooting terminal.

BACKGROUND

Due to a restriction on hardware aspects, such as a lens, an aperture and a sensor, there is a relatively large gap between quality of an image shot by a mobile phone and an image shot by a digital camera. Factors affecting image quality mainly include noise, contrast, sharpness, color, and the like. For a cost reason, on a basis that a hardware condition is not improved, image quality can be improved using an image processing algorithm.

In the prior art, a noise level of a shot image is mainly assessed to determine that area information that is lower than the noise level in the image is noise information, and determine that area information that is higher than the noise level in the image is effective image information; then noise suppression processing is performed on the area information that is lower than the noise level using a fixed image noise reduction algorithm, so as to achieve an objective of noise reduction; and enhancement processing is performed on the area information that is higher than the noise level using a fixed contrast enhancement algorithm and sharpness enhancement algorithm, so as to achieve an objective of image enhancement, and therefore, image quality can be improved.

In a process of implementing the present invention, the inventor finds that in the prior art, image quality is uneven when different shot images are processed.

SUMMARY

The present invention provides an image processing method and apparatus, and a shooting terminal, which are used to perform image processing on a to-be-processed image according to shooting characteristic information of the to-be-processed image, so as to adaptively improve the quality of each image.

According to a first aspect, an embodiment of the present invention provides an image processing method, including acquiring a to-be-processed image that is shot but is not image-processed; extracting shooting characteristic information of the to-be-processed image; and performing image processing on the to-be-processed image according to the shooting characteristic information.

In a first possible implementation manner of the first aspect, the performing image processing on the to-be-processed image according to the shooting characteristic information includes performing noise reduction and/or enhancement processing on the to-be-processed image according to shooting scene information and shooting metadata of the to-be-processed image.

With reference to the first possible implementation manner of the first aspect, in a second possible implementation manner of the first aspect, the performing noise reduction and/or enhancement processing on the to-be-processed image according to shooting scene information and shooting metadata of the to-be-processed image includes performing noise reduction and/or enhancement processing on luminance information of the to-be-processed image according to the shooting scene information and the shooting metadata; and/or performing noise reduction and/or enhancement processing on chrominance information of the to-be-processed image according to the shooting scene information and the shooting metadata.

With reference to the second possible implementation manner of the first aspect, in a third possible implementation manner of the first aspect, the performing noise reduction processing on luminance information of the to-be-processed image according to the shooting scene information and the shooting metadata includes performing local absolute difference calculation on the luminance information to acquire a sum of absolute difference (SAD) of neighborhood luminance values of the luminance information; obtaining a first Gaussian noise reduction filter kernel according to the SAD of neighborhood luminance values, the shooting scene information and the shooting metadata; and performing Gaussian noise reduction processing on the luminance information according to the first Gaussian noise reduction filter kernel; and the performing enhancement processing on luminance information of the to-be-processed image includes performing edge-preserving-based filtering decomposition on the luminance information to obtain luminance information of a base layer and luminance information of at least one detail layer; performing contrast enhancement processing on the luminance information of the base layer according to the shooting scene information and the shooting metadata; determining at least one gain according to the SAD of neighborhood luminance values, the shooting scene information and the shooting metadata; performing detail enhancement processing on the luminance information of the detail layer using the gain; and performing summation on the luminance information that is of the base layer and has undergone contrast enhancement processing and the luminance information that is of the detail layer and has undergone detail enhancement processing, so as to obtain the luminance information that has undergone enhancement processing.

With reference to the third possible implementation manner of the first aspect, in a fourth possible implementation manner of the first aspect, before the performing enhancement processing on the luminance information, the method further includes multiplying the luminance information that has undergone Gaussian noise reduction processing by a first coefficient $\alpha_1$ to obtain $\alpha_1$ times the luminance information that has undergone Gaussian noise reduction processing, where $\alpha_1$ is a numerical value ranging from 0 to 1; multiplying the luminance information that has not undergone Gaussian noise reduction processing by $(1-\alpha_1)$ to obtain $(1-\alpha_1)$ times the luminance information that has not undergone Gaussian noise reduction processing; and performing summation on the $\alpha_1$ times the luminance information that has undergone Gaussian noise reduction processing and the $(1-\alpha_1)$ times the luminance information that has not undergone Gaussian noise reduction processing, so as to obtain first luminance information; and the performing enhancement processing on luminance information of the to-be-processed image includes performing enhancement processing on the first luminance information.

With reference to the second possible implementation manner of the first aspect, in a fifth possible implementation manner of the first aspect, the performing noise reduction and enhancement processing on luminance information of the to-be-processed image according to the shooting scene information and the shooting metadata includes performing local absolute difference calculation on the luminance information to acquire a SAD of neighborhood luminance values of the luminance information; obtaining a first Gaussian noise reduction filter kernel according to the SAD of neighborhood luminance values, the shooting scene information and the shooting metadata; performing convolution on a high-pass filter kernel and the first Gaussian noise reduction filter kernel to acquire a convolution filter kernel; determining a weight of the convolution filter kernel according to the SAD of neighborhood luminance values, the shooting scene information and the shooting metadata; multiplying the convolution filter kernel by the weight to acquire a sharpness enhancement filter kernel; performing summation on the first Gaussian noise reduction filter kernel and the sharpness enhancement filter kernel to obtain a Gaussian noise reduction sharpening filter kernel; and performing Gaussian noise reduction processing and sharpness enhancement processing on the luminance information according to the Gaussian noise reduction sharpening filter kernel.

With reference to the third possible implementation manner of the first aspect, the fourth possible implementation manner of the first aspect, or the fifth possible implementation manner of the first aspect, in a sixth possible implementation manner of the first aspect, before the performing local absolute difference calculation on the luminance information to acquire a SAD of neighborhood luminance values of the luminance information, the method further includes performing salt and pepper noise reduction processing on the luminance information according to the shooting scene information and the shooting metadata.

With reference to the second possible implementation manner of the first aspect, the third possible implementation manner of the first aspect, the fourth possible implementation manner of the first aspect, the fifth possible implementation manner of the first aspect, or the sixth possible implementation manner of the first aspect, in a seventh possible implementation manner of the first aspect, the performing noise reduction processing on chrominance information of the to-be-processed image according to the shooting scene information and the shooting metadata includes performing local absolute difference calculation according to the chrominance information to acquire a SAD of neighborhood chrominance values of the chrominance information; acquiring a second Gaussian noise reduction filter kernel according to the SAD of neighborhood chrominance values, the shooting scene information and the shooting metadata; and performing Gaussian noise reduction processing on the chrominance information according to the second Gaussian noise reduction filter kernel; and the performing enhancement processing on chrominance information of the to-be-processed image according to the shooting scene information and the shooting metadata includes combining the chrominance information and the luminance information to obtain composite image information; acquiring color saturation of the composite image information; and adjusting the color saturation according to the shooting scene information and the shooting metadata.

With reference to the seventh possible implementation manner of the first aspect, in an eighth possible implementation manner of the first aspect, before the combining the chrominance information and the luminance information to obtain composite image information, the method further includes multiplying the luminance information that has undergone enhancement processing by a second coefficient $\alpha_2$ to obtain $\alpha_2$ times the luminance information that has undergone enhancement processing, where $\alpha_2$ is a numerical value ranging from 0 to 1; multiplying the luminance information that has undergone noise reduction processing by $(1-\alpha_2)$ to obtain $(1-\alpha_2)$ times the luminance information that has undergone noise reduction processing; performing summation on the $\alpha_2$ times the luminance information that has undergone enhancement processing and the $(1-\alpha_2)$ times the luminance information that has undergone noise reduction processing, so as to obtain second luminance information; and the combining the chrominance information and the luminance information to obtain composite image information includes combining the chrominance information and the second luminance information to obtain the composite image information.

With reference to the seventh possible implementation manner of the first aspect, or the eighth possible implementation manner of the first aspect, in a ninth possible implementation manner of the first aspect, before the performing local absolute difference calculation according to the chrominance information to acquire a SAD of neighborhood chrominance values of the chrominance information, the method further includes performing salt and pepper noise reduction processing on the chrominance information according to the shooting scene information and the shooting metadata.

According to a second aspect, an embodiment of the present invention provides an image processing apparatus, including a shooting module configured to acquire a to-be-processed image that is shot but is not image-processed; an extracting module configured to extract shooting characteristic information of the to-be-processed image; and a processing module configured to perform image processing on the to-be-processed image according to the shooting characteristic information.

In a first possible implementation manner of the second aspect, the processing module is configured to perform noise reduction and/or enhancement processing on the to-be-processed image according to shooting scene information and shooting metadata of the to-be-processed image.

With reference to the first possible implementation manner of the second aspect, in a second possible implementation manner of the second aspect, the processing module is configured to perform noise reduction and/or enhancement processing on luminance information of the to-be-processed image according to the shooting scene information and the shooting metadata; and/or perform noise reduction and/or enhancement processing on chrominance information of the to-be-processed image according to the shooting scene information and the shooting metadata.

With reference to the second possible implementation manner of the second aspect, in a third possible implementation manner of the second aspect, the processing module includes a first Gaussian noise reducing unit and/or a first enhancing unit, where the first Gaussian noise reducing unit is configured to perform local absolute difference calculation on the luminance information to acquire a SAD of neighborhood luminance values of the luminance information; obtain a first Gaussian noise reduction filter kernel according to the SAD of neighborhood luminance values, the shooting scene information and the shooting metadata; and perform Gaussian noise reduction processing on the luminance information according to the first Gaussian noise reduction filter kernel; and the first enhancing unit is configured to perform edge-preserving-based filtering decomposition on the luminance information to obtain luminance information of a base layer and luminance information of at least one detail layer; perform contrast enhancement processing on the luminance information of the base layer according to the shooting scene information and the shooting metadata; determine at least one gain according to the SAD of neighborhood luminance values, the shooting scene information and the shooting metadata; perform detail enhancement processing on the luminance information of the detail layer using the gain; and perform summation on the luminance information that is of the base layer and has undergone contrast enhancement processing and the luminance information that is of the detail layer and has undergone detail enhancement processing, so as to obtain the luminance information that has undergone enhancement processing.

With reference to the third possible implementation manner of the second aspect, in a fourth possible implementation manner of the second aspect, the processing module further includes a first acquiring unit configured to multiply the luminance information that has undergone Gaussian noise reduction processing by a first coefficient $\alpha_1$ to obtain $\alpha_1$ times the luminance information that has undergone Gaussian noise reduction processing, where $\alpha_1$ is a numerical value ranging from 0 to 1; multiply the luminance information that has not undergone Gaussian noise reduction processing by $(1-\alpha_1)$ to obtain $(1-\alpha_1)$ times the luminance information that has not undergone Gaussian noise reduction processing; and perform summation on the $\alpha_1$ times the luminance information that has undergone Gaussian noise reduction processing and the $(1-\alpha_1)$ times the luminance information that has not undergone Gaussian noise reduction processing, so as to obtain first luminance information, where the first enhancing unit is configured to perform enhancement processing on the first luminance information.

With reference to the second possible implementation manner of the second aspect, in a fifth possible implementation manner of the second aspect, the processing module includes a noise reduction enhancing unit configured to perform local absolute difference calculation on the luminance information to acquire a SAD of neighborhood luminance values of the luminance information; obtain a first Gaussian noise reduction filter kernel according to the SAD of neighborhood luminance values, the shooting scene information and the shooting metadata; perform convolution on a high-pass filter kernel and the first Gaussian noise reduction filter kernel to acquire a convolution filter kernel; determine a weight of the convolution filter kernel according to the SAD of neighborhood luminance values, the shooting scene information and the shooting metadata; multiply the convolution filter kernel by the weight to acquire a sharpness enhancement filter kernel; perform summation on the first Gaussian noise reduction filter kernel and the sharpness enhancement filter kernel to obtain a Gaussian noise reduction sharpening filter kernel; and perform Gaussian noise reduction processing and sharpness enhancement processing on the luminance information according to the Gaussian noise reduction sharpening filter kernel.

With reference to the third possible implementation manner of the second aspect, the fourth possible implementation manner of the second aspect, or the fifth possible implementation manner of the second aspect, in a sixth possible implementation manner of the second aspect, the processing module further includes a first salt and pepper noise reducing unit configured to perform salt and pepper noise reduction processing on the luminance information according to the shooting scene information and the shooting metadata.

With reference to the second possible implementation manner of the second aspect, the third possible implementation manner of the second aspect, the fourth possible implementation manner of the second aspect, the fifth possible implementation manner of the second aspect, or the sixth possible implementation manner of the second aspect, in a seventh possible implementation manner of the second aspect, the processing module further includes a second Gaussian noise reducing unit and a second enhancing unit, where the second Gaussian noise reducing unit is configured to perform local absolute difference calculation according to the chrominance information to acquire a SAD of neighborhood chrominance values of the chrominance information; acquire a second Gaussian noise reduction filter kernel according to the SAD of neighborhood chrominance values, the shooting scene information and the shooting metadata; and perform Gaussian noise reduction processing on the chrominance information according to the second Gaussian noise reduction filter kernel; and the second enhancing unit is configured to combine the chrominance information and the luminance information to obtain composite image information; acquire color saturation of the composite image information; and adjust the color saturation according to the shooting scene information and the shooting metadata.

With reference to the seventh possible implementation manner of the second aspect, in an eighth possible implementation manner of the second aspect, the processing module further includes a second acquiring unit configured to, before the second enhancing unit combines the chrominance information and the luminance information to obtain the composite image information, multiply the luminance information that has undergone enhancement processing by a second coefficient $\alpha_2$ to obtain $\alpha_2$ times the luminance information that has undergone enhancement processing, where $\alpha_2$ is a numerical value ranging from 0 to 1; multiply the luminance information that has undergone noise reduction processing by $(1-\alpha_2)$ to obtain $(1-\alpha_2)$ times the luminance information that has undergone noise reduction processing; and perform summation on the $\alpha_2$ times the luminance information that has undergone enhancement processing and the $(1-\alpha_2)$ times the luminance information that has undergone noise reduction processing, so as to obtain second luminance information, where the second enhancing unit is configured to combine the chrominance information and the second luminance information to obtain the composite image information; acquire the color saturation of the composite image information; and adjust the color saturation according to the shooting scene information and the shooting metadata.

With reference to the seventh possible implementation manner of the second aspect, or the eighth possible implementation manner of the second aspect, in a ninth possible implementation manner of the second aspect, the processing module further includes a second salt and pepper noise reducing unit configured to, before the second Gaussian noise reducing unit performs local absolute difference calculation according to the chrominance information to acquire the SAD of neighborhood chrominance values of the chrominance information, perform salt and pepper noise reduction processing on the chrominance information according to the shooting scene information and the shooting metadata.

According to a third aspect, an embodiment of the present invention further provides a shooting terminal, including the image processing apparatus described above.

In a first possible implementation manner of the third aspect, the shooting terminal includes a mobile phone or a tablet computer.

According to the image processing method and apparatus, and the shooting terminal provided in the embodiments of the present invention, a to-be-processed image that is shot but is not image-processed is acquired; shooting characteristic information is extracted from the to-be-processed image; and image processing is performed according to the shooting characteristic information. In this way, after acquiring the to-be-processed image that is shot, the shooting terminal uses the shooting characteristic information of the to-be-processed image as a basis of adaptive processing of the image, and performs processing on each to-be-processed image according to shooting characteristic information of each to-be-processed image, so that the quality of an image that is obtained after being processed by the shooting terminal can be adaptively improved.

BRIEF DESCRIPTION OF DRAWINGS

To describe the technical solutions in the embodiments of the present invention more clearly, the following briefly introduces the accompanying drawings required for describing the embodiments. The accompanying drawings in the following description show some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. The described embodiments are a part rather than all of the embodiments of the present invention. All other embodiments obtained by persons of ordinary skill in the art based on the embodiments of the present invention without creative efforts shall fall within the protection scope of the present invention.

Figure 1:
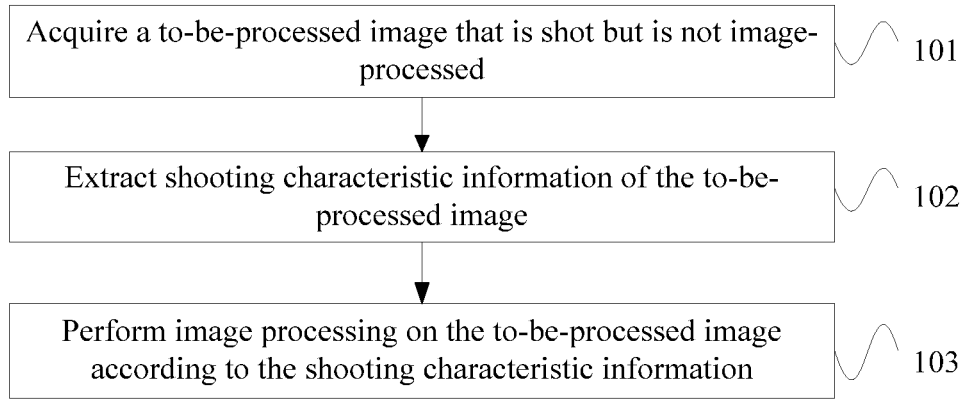
FIG. 1 is a flowchart of a first embodiment of an image processing method according to the present invention.

FIG. 1 is a flowchart of a first embodiment of an image processing method according to the present invention. As shown in FIG. 1, this embodiment can be implemented using an image processing apparatus, and the apparatus, for example, may be integrated into a shooting terminal to implement the method in this embodiment. The method in this embodiment may include the following steps.

Step 101: Acquire a to-be-processed image that is shot but is not image-processed.

In this embodiment, the to-be-processed image that is shot is acquired. The to-be-processed image may be an image that is not processed using an image processing algorithm, for example, may be an image shot by a shooting terminal, where the shooting terminal may be a device having a shooting lens, such as a mobile phone, a tablet computer (PAD), a notebook computer or a multi-functional player. Due to a restriction on a hardware condition of these shooting terminals, the quality of a shot image is relatively poor. Therefore, the image needs to be processed.

Step 102: Extract shooting characteristic information of the to-be-processed image.

In this embodiment, after the to-be-processed image that is shot is acquired, the shooting characteristic information of the to-be-processed image is directly extracted from the to-be-processed image. The shooting characteristic information may be information about a scene shot in the to-be-processed image, for example, the blue sky, green plants, the sunset, a night scene, and a person, and may also be metadata when the to-be-processed image is shot, for example, light sensitivity and exposure time when the to-be-processed image is shot. It should be noted that, a characteristic may be used as the shooting characteristic information used in this embodiment, as long as the characteristic can reflect the to-be-processed image.

Step 103: Perform image processing on the to-be-processed image according to the shooting characteristic information.

In this embodiment, the shooting characteristic information can be extracted in real time from the to-be-processed image shot by the shooting terminal; the shooting characteristic information can reflect a characteristic and a quality defect that need to be concerned for the to-be-processed image; and shooting characteristic information of to-be-processed images may be different, and therefore, image processing may be specially performed on different to-be-processed images according to different shooting characteristic information.

In the prior art, after a shooting terminal acquires a shot image, a fixed image processing manner is used, for example, a fixed image processing algorithm that is preset in the shooting terminal is used for image processing, that is, in the prior art, the same processing is performed on different to-be-processed images that are shot. Therefore, adaptability of image processing is relatively poor, which causes that quality of processed images is uneven.

Compared with the prior art, in this embodiment, after acquiring the to-be-processed image that is shot, the shooting terminal uses the shooting characteristic information of the to-be-processed image that is not image-processed as a basis of adaptive processing of the image, and performs processing on each to-be-processed image according to shooting characteristic information of each to-be-processed image, so that the quality of an image that is obtained after being processed by the shooting terminal can be adaptively improved.

It should be noted that the image processing method in this embodiment may be applied after the shooting terminal acquires a raw image that is shot, and executed before the image is displayed on a display screen of the shooting terminal.

According to the image processing method provided in the first embodiment of the present invention, a to-be-processed image that is shot but is not image-processed is acquired;

shooting characteristic information is extracted from the to-be-processed image; and image processing is performed according to the shooting characteristic information. In this way, after acquiring the to-be-processed image that is shot, a shooting terminal uses the shooting characteristic information of the to-be-processed image as a basis of adaptive processing of the image, and performs processing on each to-be-processed image according to shooting characteristic information of each to-be-processed image, so that the quality of an image that is obtained after being processed by the shooting terminal can be adaptively improved.

Figure 2:
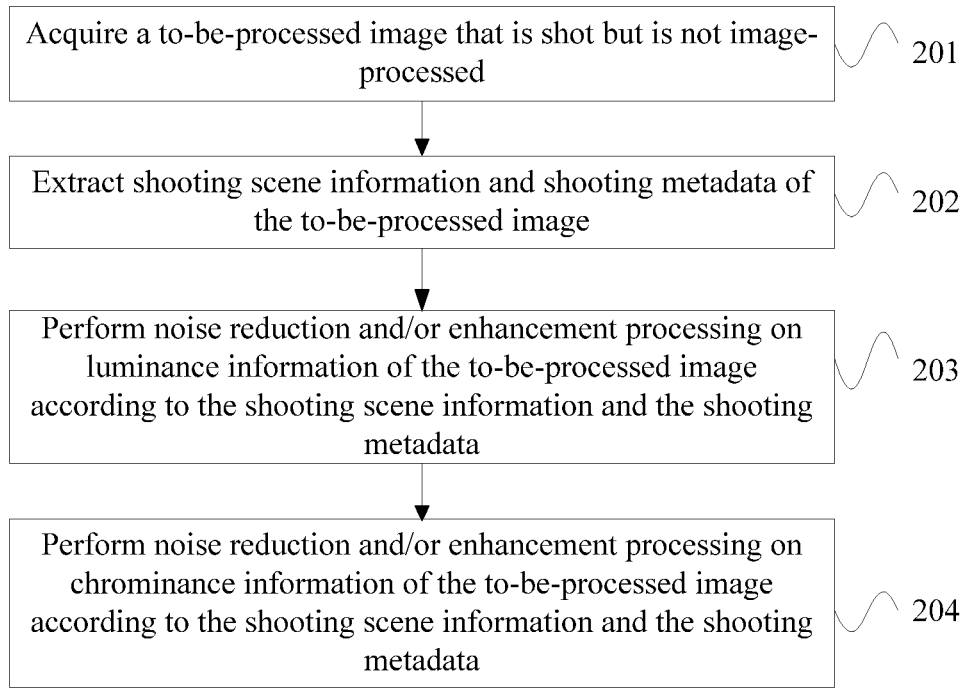
FIG. 2 is a flowchart of a second embodiment of an image processing method according to the present invention.

FIG. 2 is a flowchart of a second embodiment of an image processing method according to the present invention. As shown in FIG. 2, this embodiment can be implemented using an image processing apparatus, and the apparatus, for example, may be integrated into a shooting terminal to implement the method in this embodiment. The method in this embodiment may include the following steps.

Step 201: Acquire a to-be-processed image that is shot but is not image-processed.

In this embodiment, the to-be-processed image that is shot is acquired. The to-be-processed image may be an image that is not processed using an image processing algorithm, for example, may be an image shot by a shooting terminal, where the shooting terminal may be a device having a shooting lens, such as a mobile phone, a PAD, a notebook computer or a multi-functional player. Due to a restriction on a hardware condition of these shooting terminals, the quality of a shot image is relatively poor. Therefore, the image needs to be processed.

Step 202: Extract shooting scene information and shooting metadata of the to-be-processed image.

In this embodiment, after the to-be-processed image that is shot is acquired, the shooting scene information and the shooting metadata of the to-be-processed image are directly extracted from the to-be-processed image. The shooting scene information may be a blue sky scene, a green plant scene, a sunset scene, a night scene, a low illumination scene, a person face area, and the like. The shooting metadata may be light sensitivity, exposure time and the like when the to-be-processed image is shot. Persons of ordinary skill in the art may understand that extraction of the shooting scene information and the shooting metadata is consistent with that in the prior art, and details are not repeatedly described herein in this embodiment.

In this embodiment, after the shooting scene information and the shooting metadata are obtained, noise reduction and/or enhancement processing may be performed on the to-be-processed image according to the shooting scene information and the shooting metadata. The shooting scene information and the shooting metadata that are extracted from the to-be-processed image can reflect which quality defects exist in the to-be-processed image, and therefore, noise reduction and/or enhancement processing may be specially performed to improve the quality of the image. During specific implementation, the to-be-processed image is decomposed into luminance information and chrominance information of the to-be-processed image, and performing noise reduction and/or enhancement processing on the to-be-processed image according to the shooting scene information and the shooting metadata may include step 203 and step 204. Persons of ordinary skill in the art may understand that dividing the to-be-processed image into the luminance information and the chrominance information of the to-be-processed image is consistent with color space conversion in the prior art, and details are not repeatedly described herein in this embodiment.

Step 203: Perform noise reduction and/or enhancement processing on luminance information of the to-be-processed image according to the shooting scene information and the shooting metadata.

In this embodiment, performing noise reduction processing on the luminance information of the to-be-processed image according to the shooting scene information and the shooting metadata may include performing local absolute difference calculation on the luminance information to acquire a SAD of neighborhood luminance values of the luminance information; obtaining a first Gaussian noise reduction filter kernel according to the SAD of neighborhood luminance values, the shooting scene information and the shooting metadata; and performing Gaussian noise reduction processing on the luminance information according to the first Gaussian noise reduction filter kernel.

Persons of ordinary skill in the art may understand that, performing local absolute difference calculation is consistent with that in the prior art, and details are not repeatedly described herein in this embodiment. A SAD (that is, a sum of absolute values of luminance value differences between a central pixel and neighborhood pixels) of neighborhood luminance values of each pixel may be acquired by means of local absolute difference calculation. Each SAD of neighborhood luminance values may represent a local characteristic of each pixel (for example, whether the pixel is located in an edge area or a flat area). The first Gaussian noise reduction filter kernel is obtained according to the SAD of neighborhood luminance values, the shooting scene information and the shooting metadata, where the first Gaussian noise reduction filter kernel may be a bilateral filter kernel in the prior art, and details are not repeatedly described herein in this embodiment. Because a variance parameter in the first Gaussian noise reduction filter kernel determines a noise reduction degree. A larger variance parameter leads to a larger noise reduction degree. Therefore, after a SAD of neighborhood luminance values of each pixel is acquired, analysis is performed on each SAD of neighborhood luminance values, that a larger SAD of neighborhood luminance values indicates a larger intensity value of edge information and more edge information included in the pixel. To maintain that the edge information is not blurred in a noise reduction process, a variance parameter in a first Gaussian noise reduction filter kernel corresponding to the pixel may be reduced. Correspondingly, that a smaller SAD of neighborhood luminance values indicates a smaller intensity value of the edge information and less edge information included by the pixel. To ensure noise reduction effect, the variance parameter in the first Gaussian noise reduction filter kernel corresponding to the pixel may be increased. Because SADs of neighborhood luminance values of pixels may be different, different variance parameters may be determined according to different SADs of neighborhood luminance values. Further, if light sensitivity in the shooting metadata of the to-be-processed image is low, the variance parameter in the first Gaussian noise reduction filter kernel may be reduced to weaken the noise reduction degree; if the light sensitivity in the shooting metadata of the to-be-processed image is high, the variance parameter in the first Gaussian noise reduction filter kernel may be increased to strengthen the noise reduction degree; and if the shooting scene information of the to-be-processed image is a night scene or a low illumination scene, the variance parameter in the first Gaussian noise reduction filter kernel may be increased to strengthen the noise reduction degree. In this way, the first Gaussian noise reduction filter kernel may be determined; the first Gaussian noise reduction filter kernel is used to generate a Gaussian noise reduction filter; and Gaussian noise reduction processing is performed on the luminance information, so as to perform noise reduction processing on Gaussian noise.

In this embodiment, performing noise reduction processing on the luminance information of the to-be-processed image according to the shooting scene information and the shooting metadata may include performing edge-preserving-based filtering decomposition on the luminance information to obtain luminance information of a base layer and luminance information of at least one detail layer; performing contrast enhancement processing on the luminance information of the base layer according to the shooting scene information and the shooting metadata; determining at least one gain according to the SAD of neighborhood luminance values, the shooting scene information and the shooting metadata; performing detail enhancement processing on the luminance information of the detail layer using the gain; and performing summation on the luminance information that is of the base layer and has undergone contrast enhancement processing and the luminance information that is of the detail layer and has undergone detail enhancement processing, so as to obtain the luminance information that has undergone enhancement processing.

An edge-preserving-based filtering algorithm (for example, a bilateral filtering algorithm, and another filtering algorithm having an edge-preserving feature) may be used to perform multilevel decomposition on the luminance information, so as to obtain luminance information of one base layer and luminance information of multiple detail layers with different detail degrees, so that detail contrast of each layer can be managed in a subsequent enhancement processing process to improve definition of the image. For example, two-level edge-preserving filtering decomposition may be performed on the luminance information to obtain luminance information of the base layer, luminance information of a medium detail layer, and luminance information of a small detail layer. Then, contrast enhancement processing may be performed on the luminance information of the base layer according to the shooting scene information and the shooting metadata, so as to improve luminance and contrast of a highlight area and a darker area, where a contrast enhancement algorithm may include tone mapping, histogram equalization, linear stretching, Gamma correction, and the like. For example, when the shooting scene information is a backlight scene, a shape of a tone mapping curve may be controlled to brighten a dark area in an image.

In this embodiment, a gain of luminance information of each detail layer may be obtained according to the SAD of neighborhood luminance values, the shooting scene information and the shooting metadata. For example, because the high frequency luminance information of the small detail layer may include more noise, a smaller gain may be set for the luminance information of the small detail layer; because the intermediate frequency luminance information of the medium detail layer includes more detail information and edge information, a greater gain may be set for the luminance information of the medium detail layer; if light sensitivity in the shooting metadata is low, gains of the luminance information of the medium detail layer and the luminance information of the small detail layer may be separately increased to strengthen edge information enhancement, so as to enable the detail information to be more abundant; if the light sensitivity in the shooting metadata is high, the gains of the luminance information of the medium detail layer and the luminance information of the small detail layer may be separately reduced to weaken edge information enhancement; and if the shooting scene information is a person face area, the gains of the luminance information of the medium detail layer and the luminance information of the small detail layer may be separately reduced to weaken edge information enhancement, so as to enable a person face to be displayed more naturally. In this way, it may be implemented that the gains of the luminance information of the medium detail layer and the luminance information of the small detail layer are separately determined according to the shooting scene information and the shooting metadata, and detail enhancement processing is separately performed on luminance information of each detail layer using each gain, and then, summation is performed on the luminance information that is of the base layer and has undergone contrast enhancement processing, the luminance information that is of the medium detail layer and has undergone detail enhancement processing, and the luminance information that is of the small detail layer and has undergone detail enhancement processing, so as to obtain the luminance information that has undergone enhancement processing. It should be noted that the luminance information that has not undergone enhancement processing may be luminance information that has not undergone noise reduction processing, and may also be luminance information that has undergone noise reduction processing.

Optionally, before performing enhancement processing on the luminance information, the method may further include multiplying the luminance information that has undergone Gaussian noise reduction processing by a first coefficient $\alpha_1$ to obtain $\alpha_1$ times the luminance information that has undergone Gaussian noise reduction processing, where $\alpha_1$ is a numerical value ranging from 0 to 1; multiplying the luminance information that has not undergone Gaussian noise reduction processing by $(1-\alpha_1)$ to obtain $(1-\alpha_1)$ times the luminance information that has not undergone Gaussian noise reduction processing; performing summation on the $\alpha_1$ times the luminance information that has undergone Gaussian noise reduction processing and the $(1-\alpha_1)$ times the luminance information that has not undergone Gaussian noise reduction processing, so as to obtain first luminance information; and performing enhancement processing on the first luminance information. For a specific implementation process, refer to the foregoing related description in this embodiment, and details are not repeatedly described herein. It should be noted that a value of $\alpha_1$ is determined according to an actual application scenario, which is not limited herein in this embodiment.

Step 204: Perform noise reduction and/or enhancement processing on chrominance information of the to-be-processed image according to the shooting scene information and the shooting metadata.

In this embodiment, performing noise reduction processing on the chrominance information of the to-be-processed image according to the shooting scene information and the shooting metadata may include performing local absolute difference calculation on the chrominance information to acquire a SAD of neighborhood chrominance values of the chrominance information; acquiring a second Gaussian noise reduction filter kernel according to the SAD of neighborhood chrominance values, the shooting scene information and the shooting metadata; and performing Gaussian noise reduction processing on the chrominance information according to the second Gaussian noise reduction filter kernel.

A process of performing noise reduction processing on the chrominance information is similar to the foregoing process of performing noise reduction processing on the luminance information in this embodiment. For details, refer to the foregoing related description, and details are not repeatedly described herein in this embodiment.

It should be noted that one of step 203 and step 204 may also be selected for execution.

In this embodiment, performing enhancement processing on the chrominance information of the to-be-processed image according to the shooting scene information and the shooting metadata may include combining the chrominance information and the luminance information to obtain composite image information; acquiring color saturation of the composite image information; and adjusting the color saturation according to the shooting scene information and the shooting metadata.

The chrominance information and the luminance information are combined to obtain the composite image information; each color saturation is acquired from the composite image information; and the color saturation is adjusted according to the shooting scene information and the shooting metadata, so as to improve brilliance of the image. It should be noted that, acquiring the color saturation is consistent with that in the prior art, and details are not repeatedly described herein in this embodiment. For example, if light sensitivity in the shooting metadata is low, each color saturation may be increased to brighten a color; if the light sensitivity in the shooting metadata is high, enhancement of each color saturation may be weakened to reduce color noise; if the shooting scene information is a blue sky scene, saturation of a pixel point with a blue color may be increased to enable the blue sky to be bluer; if the shooting scene information is a green plant scene, saturation of a pixel point with a green color may be increased to enable green plants to be greener; and if the shooting scene information is a sunset scene, saturation of a pixel point with a reddish-yellow color may be increased to enable the sunset to be more gorgeous. It should be noted that, the chrominance information that is used for combination may be the chrominance information that has not undergone noise reduction processing, and may also be the chrominance information that has undergone noise reduction processing; and the luminance information that is used for combination may be the luminance information that has undergone noise reduction processing, and may also be the luminance information that has undergone enhancement processing.

Optionally, before the combining the chrominance information and the luminance information to obtain the composite image information, the method may further include multiplying the luminance information that has undergone enhancement processing by a second coefficient $\alpha_2$ to obtain $\alpha_2$ times the luminance information that has undergone enhancement processing, where $\alpha_2$ is a numerical value ranging from 0 to 1; multiplying the luminance information that has undergone noise reduction processing by $(1-\alpha_2)$ to obtain $(1-\alpha_2)$ times the luminance information that has undergone noise reduction processing; performing summation on the $\alpha_2$ times the luminance information that has undergone enhancement processing and the $(1-\alpha_2)$ times the luminance information that has undergone noise reduction processing, so as to obtain second luminance information; and combining the chrominance information and the second luminance information to obtain the composite image information. For a specific implementation process, refer to the foregoing detailed description in this embodiment, and details are not repeatedly described herein. It should be noted that a value of $\alpha_2$ is determined according to an actual application scenario, which is not limited herein in this embodiment.

According to the image processing method provided in the second embodiment of the present invention, a to-be-processed image that is shot but is not image-processed is acquired; shooting scene information and shooting metadata of the to-be-processed image are extracted; noise reduction and/or enhancement processing is performed on luminance information of the to-be-processed image according to the shooting scene information and the shooting metadata; and noise reduction and/or enhancement processing is performed on chrominance information of the to-be-processed image according to the shooting scene information and the shooting metadata. In this way, after acquiring the to-be-processed image that is shot, a shooting terminal uses the shooting scene information and the shooting metadata of the to-be-processed image as a basis of adaptive processing of the image, and performs processing on chrominance information and luminance information of each to-be-processed image according to shooting scene information and shooting metadata of each to-be-processed image, so that the quality of an image that is obtained after being processed by the shooting terminal can be adaptively improved.

Figure 3A:
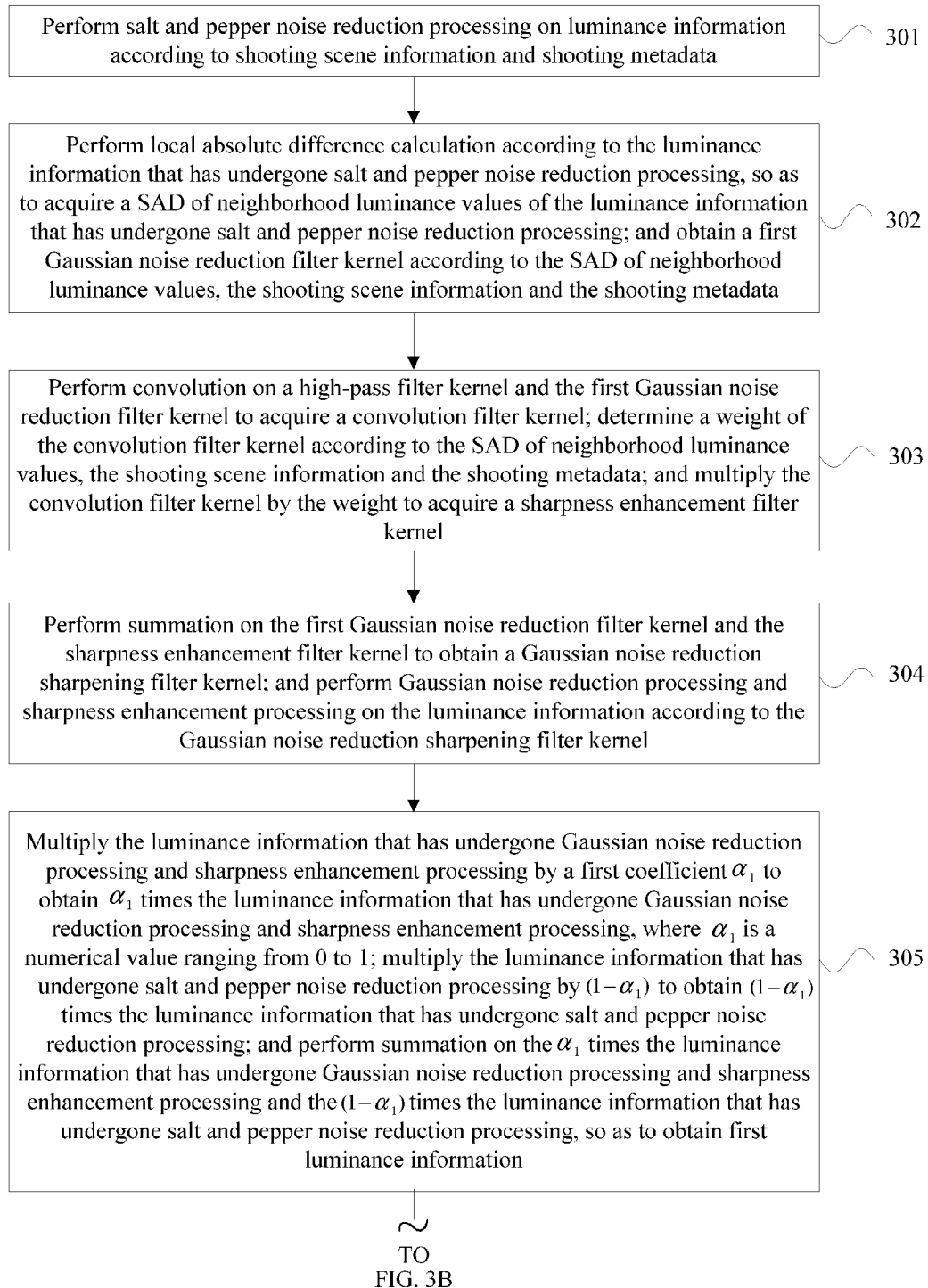
FIG. 3A and FIG. 3B are flowcharts of a third embodiment of an image processing method according to the present invention.
Figure 3B:
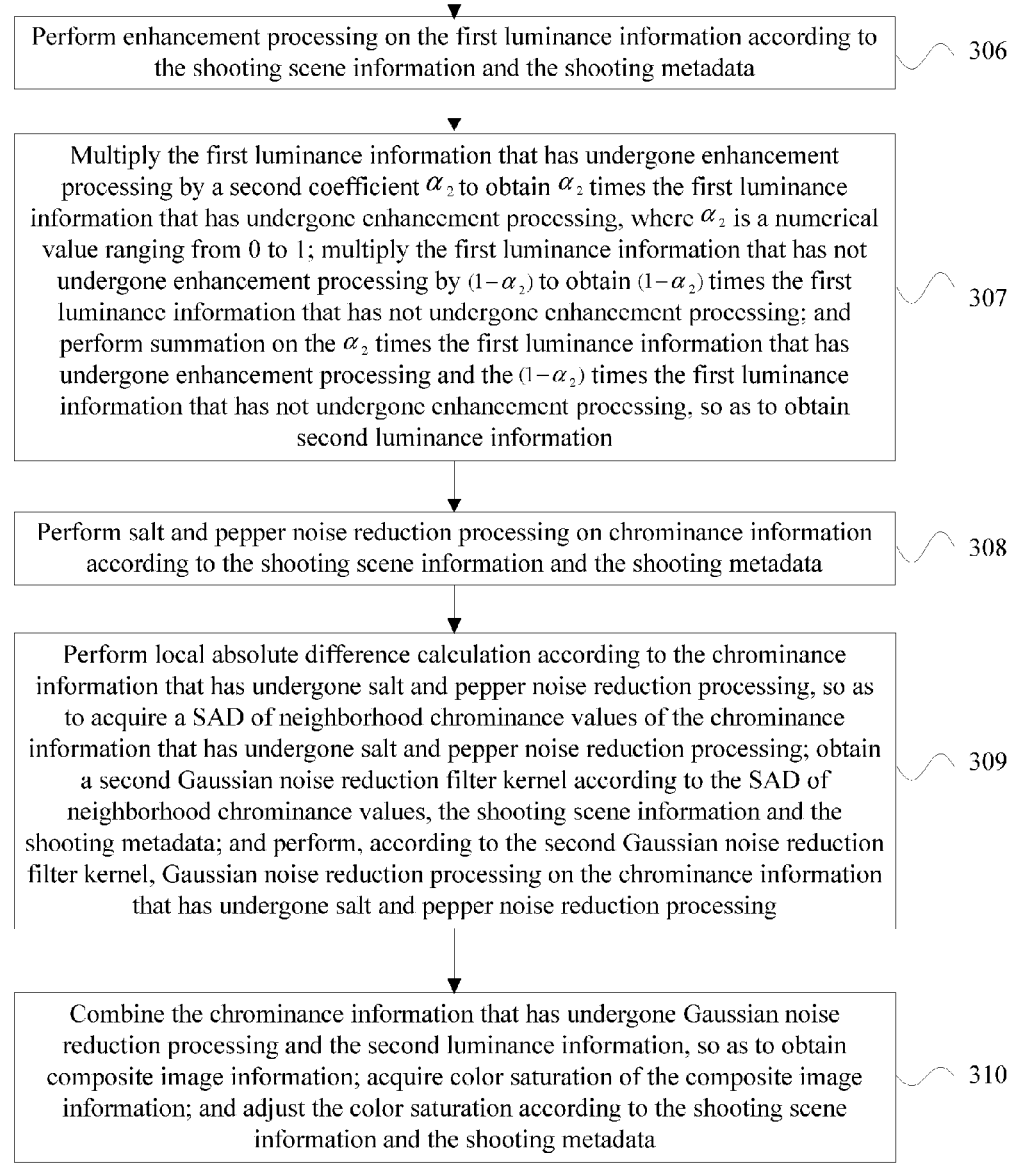

FIG. 3A and FIG. 3B are flowcharts of a third embodiment of an image processing method according to the present invention. As shown in FIG. 3A and FIG. 3B, this embodiment can be implemented using an image processing apparatus, and the apparatus, for example, may be integrated into a shooting terminal to implement the method in this embodiment. The method in this embodiment is a further detailed solution of the method embodiment shown in FIG. 2. The method in this embodiment includes the following steps.

Step 301: Perform salt and pepper noise reduction processing on luminance information according to shooting scene information and shooting metadata.

In this embodiment, a salt and pepper noise reduction filter (for example, a standard median filter) that has salt and pepper noise removal effect may be used to perform salt and pepper noise reduction processing on luminance; a size of a neighborhood window of the salt and pepper noise reduction filter may be adjusted according to the shooting scene information and the shooting metadata; and then salt and pepper noise reduction processing is performed on the luminance information, so as to perform noise reduction processing on salt and pepper noise. If light sensitivity in the shooting metadata is low, the size of the neighborhood window of the salt and pepper noise reduction filter may be reduced to weaken a noise reduction processing degree; if the light sensitivity in the shooting metadata is high, the size of the neighborhood window of the salt and pepper noise reduction filter may be increased to strengthen the noise reduction processing degree; and if the shooting scene information is a night scene or a low illumination scene, the size of the neighborhood window of the salt and pepper noise reduction filter may be increased to strengthen the noise reduction processing degree.

Step 302: Perform local absolute difference calculation on the luminance information that has undergone salt and pepper noise reduction processing, so as to acquire a SAD of neighborhood luminance values of the luminance information that has undergone salt and pepper noise reduction processing; and obtain a first Gaussian noise reduction filter kernel according to the SAD of neighborhood luminance values, the shooting scene information and the shooting metadata.

In this embodiment, after salt and pepper noise reduction processing is performed on the luminance information, local absolute difference calculation is performed according to the luminance information that has undergone salt and pepper noise reduction processing, so as to acquire the SAD of neighborhood luminance values of the luminance information that has undergone salt and pepper noise reduction processing; and the first Gaussian noise reduction filter kernel is obtained according to the SAD of neighborhood luminance values, the shooting scene information and the shooting metadata. For a specific implementation process of step 302, refer to the related description of performing noise reduction processing on the luminance information according to the shooting scene information and the shooting metadata in step 203 in the second embodiment of the present invention, and details are not repeatedly described herein in this embodiment.

Step 303: Perform convolution on a high-pass filter kernel and the first Gaussian noise reduction filter kernel to acquire a convolution filter kernel; determine a weight of the convolution filter kernel according to the SAD of neighborhood luminance values, the shooting scene information and the shooting metadata; and multiply the convolution filter kernel by the weight to acquire a sharpness enhancement filter kernel.

In this embodiment, the high-pass filter kernel may be a filter kernel (for example, a Laplacian high-pass filter kernel) having a high-pass feature. Convolution is performed on the high-pass filter kernel and the first Gaussian noise reduction filter kernel to obtain the convolution filter kernel; the weight of the convolution filter kernel is determined according to the SAD of neighborhood luminance values, the shooting scene information and the shooting metadata; and the convolution filter kernel is multiplied by the weight to acquire the sharpness enhancement filter kernel. For example, if the SAD of neighborhood luminance values is larger, it indicates that there is more edge information, the weight may be increased to strengthen edge enhancement processing; if the SAD of neighborhood luminance values is smaller, it indicates that there is less edge information and more noise, the weight may be reduced to suppress noise; if light sensitivity in the shooting metadata is low, the weight may be increased to strengthen edge enhancement processing; if the light sensitivity in the shooting metadata is high, the weight may be reduced to suppress noise amplification; and if the shooting scene information is person face area information, the weight may be reduced to weaken edge enhancement processing, so as to enable a person face to be more natural.

Step 304: Perform summation on the first Gaussian noise reduction filter kernel and the sharpness enhancement filter kernel to obtain a Gaussian noise reduction sharpening filter kernel; and perform Gaussian noise reduction processing and sharpness enhancement processing on the luminance information according to the Gaussian noise reduction sharpening filter kernel.

In this embodiment, summation is performed on the first Gaussian noise reduction filter kernel and the sharpness enhancement filter kernel to obtain the Gaussian noise reduction sharpening filter kernel, and then a Gaussian noise reduction sharpening filter is generated according to the Gaussian noise reduction sharpening filter kernel. Because the first Gaussian noise reduction filter kernel is determined according to the SAD of neighborhood luminance values (that is, edge information), the Gaussian noise reduction sharpening filter may perform smooth noise reduction processing on the luminance information in a direction of the edge information, and may perform edge enhancement processing on the luminance information in a direction perpendicular to that of the edge information. In this way, Gaussian noise reduction processing and sharpness enhancement processing can be simultaneously performed on the luminance information, and image processing efficiency is improved.

Step 305: Multiply the luminance information that has undergone Gaussian noise reduction processing and sharpness enhancement processing by a first coefficient $\alpha_1$ to obtain $\alpha_1$ times the luminance information that has undergone Gaussian noise reduction processing and sharpness enhancement processing, where $\alpha_1$ is a numerical value ranging from 0 to 1; multiply the luminance information that has undergone salt and pepper noise reduction processing by $(1-\alpha_1)$ to obtain $(1-\alpha_1)$ times the luminance information that has undergone salt and pepper noise reduction processing; and perform summation on the $\alpha_1$ times the luminance information that has undergone Gaussian noise reduction processing and sharpness enhancement processing and the $(1-\alpha_1)$ times the luminance information that has undergone salt and pepper noise reduction processing, so as to obtain first luminance information.

In this embodiment, it should be noted that a value of $\alpha_1$ is determined according to an actual application scenario, which is not limited herein in this embodiment.

Step 306: Perform enhancement processing on the first luminance information according to the shooting scene information and the shooting metadata.

In this embodiment, for a specific implementation process of step 306, refer to the related description of performing enhancement processing on the luminance information according to the shooting scene information and the shooting metadata in step 203 in the second embodiment of the present invention, and details are not repeatedly described herein in this embodiment.

Step 307: Multiply the first luminance information that has undergone enhancement processing by a second coefficient $\alpha_2$ to obtain $\alpha_2$ times the first luminance information that has undergone enhancement processing, where $\alpha_2$ is a numerical value ranging from 0 to 1; multiply the first luminance information that has not undergone enhancement processing by $(1-\alpha_2)$ to obtain $(1-\alpha_2)$ times the first luminance information that has not undergone enhancement processing; and perform summation on the $\alpha_2$ times the first luminance information that has undergone enhancement processing and the $(1-\alpha_2)$ times the first luminance information that has not undergone enhancement processing, so as to obtain second luminance information.

In this embodiment, it should be noted that a value of $\alpha_2$ is determined according to an actual application scenario, which is not limited herein in this embodiment.

Step 308: Perform salt and pepper noise reduction processing on chrominance information according to the shooting scene information and the shooting metadata.

In this embodiment, for a specific implementation process of step 308, refer to the related description in step 301 in this embodiment, and details are not repeatedly described herein in this embodiment.

Step 309: Perform local absolute difference calculation on the chrominance information that has undergone salt and pepper noise reduction processing, so as to acquire a SAD of neighborhood chrominance values of the chrominance information that has undergone salt and pepper noise reduction processing; obtain a second Gaussian noise reduction filter kernel according to the SAD of neighborhood chrominance values, the shooting scene information and the shooting metadata; and perform, according to the second Gaussian noise reduction filter kernel, Gaussian noise reduction processing on the chrominance information that has undergone salt and pepper noise reduction processing.

In this embodiment, for a specific implementation process of step 309, refer to the related description of performing noise reduction processing on the chrominance information according to the shooting scene information and the shooting metadata in step 204 in the second embodiment of the present invention, and details are not repeatedly described herein in this embodiment.

Step 310: Combine the chrominance information that has undergone Gaussian noise reduction processing and the second luminance information to obtain composite image information; acquire color saturation of the composite image information; and adjust the color saturation according to the shooting scene information and the shooting metadata.

In this embodiment, for a specific implementation process of step 310, refer to the related description of performing enhancement processing on the chrominance information of the to-be-processed image according to the shooting scene information and the shooting metadata in step 204 in the second embodiment of the present invention, and details are not repeatedly described herein in this embodiment.

It should be noted that step 308 and step 309 may be executed before step 301 to step 307; or step 308 and step 309, and step 301 to step 307 may be executed at the same time, which is not limited herein in this embodiment.

According to the image processing method provided in the third embodiment of the present invention, on a basis of the second embodiment of the method shown in FIG. 2, further, after acquiring a to-be-processed image that is shot, a shooting terminal uses shooting scene information and shooting metadata of the to-be-processed image as a basis of adaptive processing of the image, and separately performs integrated processing, such as salt and pepper noise reduction processing, Gaussian noise reduction processing, and enhancement processing, on chrominance information and luminance information of each to-be-processed image according to shooting characteristic information of each to-be-processed image, thereby achieving effect such as noise reduction, contrast improvement, edge strengthening, and saturation adjustment, so that the quality of an image that is obtained after being processed by the shooting terminal is adaptively improved, and processing efficiency of each image is also improved.

It should be noted that, an image can be specially and dynamically processed in real time according to shooting scene information and shooting metadata using the image processing method provided in the foregoing embodiment of the present invention. In this way, the foregoing embodiment of the present invention is more universal and is more widely applicable, and has great significance for improving the quality of images shot in various scenes and enhancing shooting experience of a user.

Figure 4:
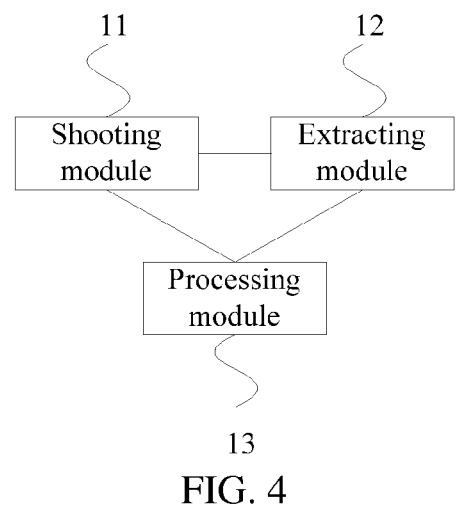
FIG. 4 is a schematic structural diagram of a first embodiment of an image processing apparatus according to the present invention.

FIG. 4 is a schematic structural diagram of a first embodiment of an image processing apparatus according to the present invention. As shown in FIG. 4, the apparatus in this embodiment may include a shooting module 11, an extracting module 12 and a processing module 13, where the shooting module 11 is configured to acquire a to-be-processed image that is shot but is not image-processed; the extracting module 12 is configured to extract shooting characteristic information of the to-be-processed image; and the processing module 13 is configured to perform image processing on the to-be-processed image according to the shooting characteristic information.

The image processing apparatus provided in the first embodiment of the image processing apparatus of the present invention may be configured to execute the technical solution in the method embodiment shown in FIG. 1, and their implementation principles and technical effect are similar. For details, refer to the related description in the foregoing embodiment, and details are not repeatedly described herein.

Figure 5:
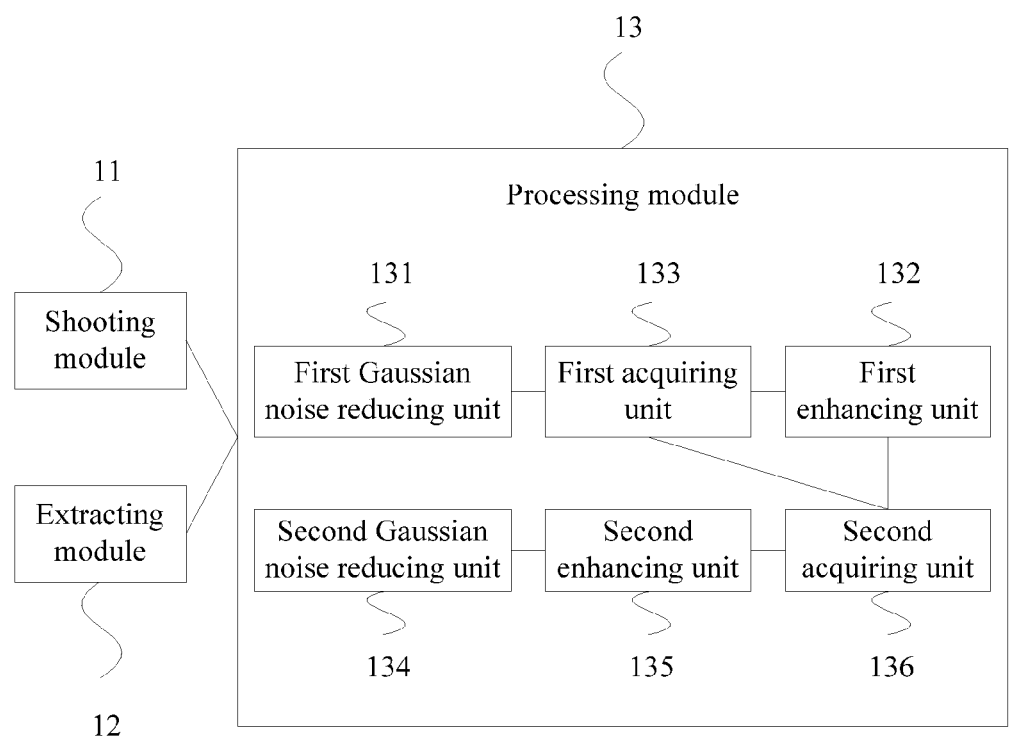
FIG. 5 is a schematic structural diagram of a second embodiment of an image processing apparatus according to the present invention.

FIG. 5 is a schematic structural diagram of a second embodiment of an image processing apparatus according to the present invention. As shown in FIG. 5, in the apparatus in this embodiment, on a basis of a structure of the apparatus shown in FIG. 4, the processing module 13 is configured to perform noise reduction and/or enhancement processing on the to-be-processed image according to shooting scene information and shooting metadata of the to-be-processed image. Further, the processing module 13 is configured to perform noise reduction and/or enhancement processing on luminance information of the to-be-processed image according to the shooting scene information and the shooting metadata; and/or perform noise reduction and/or enhancement processing on chrominance information of the to-be-processed image according to the shooting scene information and the shooting metadata.

Further, the processing module 13 may include a first Gaussian noise reducing unit 131 and/or a first enhancing unit 132, where the first Gaussian noise reducing unit 131 is configured to perform local absolute difference calculation on the luminance information to acquire a SAD of neighborhood luminance values of the luminance information; obtain a first Gaussian noise reduction filter kernel according to the SAD of neighborhood luminance values, the shooting scene information and the shooting metadata; and perform Gaussian noise reduction processing on the luminance information according to the first Gaussian noise reduction filter kernel. The first enhancing unit 132 is configured to perform edge-preserving-based filtering decomposition on the luminance information to obtain luminance information of a base layer and luminance information of at least one detail layer; perform contrast enhancement processing on the luminance information of the base layer according to the shooting scene information and the shooting metadata; determine at least one gain according to the SAD of neighborhood luminance values, the shooting scene information and the shooting metadata; perform detail enhancement processing on the luminance information of the detail layer using the gain; and perform summation on the luminance information that is of the base layer and has undergone contrast enhancement processing and the luminance information that is of the detail layer and has undergone detail enhancement processing, so as to obtain the luminance information that has undergone enhancement processing.

Optionally, the processing module 13 further includes a first acquiring unit 133, where the first acquiring unit 133 is configured to multiply the luminance information that has undergone Gaussian noise reduction processing by a first coefficient $\alpha_1$ to obtain $\alpha_1$ times the luminance information that has undergone Gaussian noise reduction processing, where $\alpha_1$ is a numerical value ranging from 0 to 1; multiply the luminance information that has not undergone Gaussian noise reduction processing by $(1-\alpha_1)$ to obtain $(1-\alpha_1)$ times the luminance information that has not undergone Gaussian noise reduction processing; and perform summation on the $\alpha_1$ times the luminance information that has undergone Gaussian noise reduction processing and the $(1-\alpha_1)$ times the luminance information that has not undergone Gaussian noise reduction processing, so as to obtain first luminance information. The first enhancing unit 132 is configured to perform enhancement processing on the first luminance information.

The processing module 13 further includes a second Gaussian noise reducing unit 134 and a second enhancing unit 135, where the second Gaussian noise reducing unit 134 is configured to perform local absolute difference calculation according to the chrominance information to acquire a SAD of neighborhood chrominance values of the chrominance information; acquire a second Gaussian noise reduction filter kernel according to the SAD of neighborhood chrominance values, the shooting scene information and the shooting metadata; and perform Gaussian noise reduction processing on the chrominance information according to the second Gaussian noise reduction filter kernel. The second enhancing unit 135 is configured to combine the chrominance information and the luminance information to obtain composite image information; acquire color saturation of the composite image information; and adjust the color saturation according to the shooting scene information and the shooting metadata.

Optionally, the processing module 13 may further include a second acquiring unit 136, where the second acquiring unit 136 is configured to, before the second enhancing unit 135 combines the chrominance information and the luminance information to obtain the composite image information, multiply the luminance information that has undergone enhancement processing by a second coefficient $\alpha_2$ to obtain $\alpha_2$ times the luminance information that has undergone enhancement processing, where $\alpha_2$ is a numerical value ranging from 0 to 1; multiply the luminance information that has undergone noise reduction processing by $(1-\alpha_2)$ to obtain $(1-\alpha_2)$ times the luminance information that has undergone noise reduction processing; and perform summation on the $\alpha_2$ times the luminance information that has undergone enhancement processing and the $(1-\alpha_2)$ times the luminance information that has undergone noise reduction processing, so as to obtain second luminance information. The second enhancing unit 135 is configured to combine the chrominance information and the second luminance information to obtain the composite image information; acquire the color saturation of the composite image information; and adjust the color saturation according to the shooting scene information and the shooting metadata.

The image processing apparatus provided in the second embodiment of the image processing apparatus of the present invention may be configured to execute the technical solution in the method embodiment shown in FIG. 2, and their implementation principles and technical effect are similar. For details, refer to the related description in the foregoing embodiment, and details are not repeatedly described herein.

Figure 6:
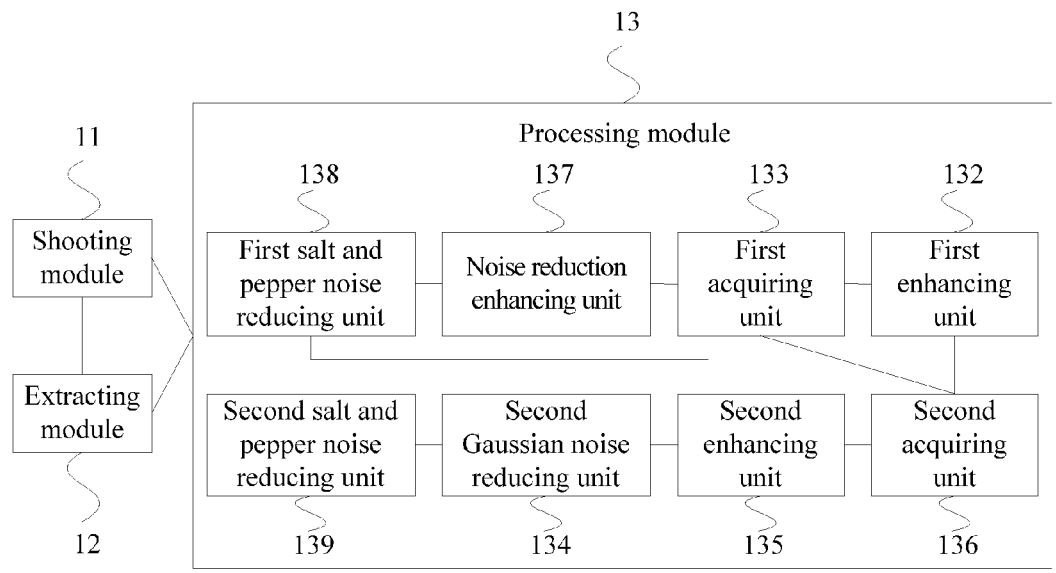
FIG. 6 is a schematic structural diagram of a third embodiment of an image processing apparatus according to the present invention.

FIG. 6 is a schematic structural diagram of a third embodiment of an image processing apparatus according to the present invention. As shown in FIG. 6, in the apparatus in this embodiment, on a basis of a structure of the apparatus shown in FIG. 5, further, the processing module 13 may include a noise reduction enhancing unit 137, where the noise reduction enhancing unit 137 is configured to perform local absolute difference calculation on the luminance information to acquire a SAD of neighborhood luminance values of the luminance information; obtain a first Gaussian noise reduction filter kernel according to the SAD of neighborhood luminance values, the shooting scene information and the shooting metadata; perform convolution on a high-pass filter kernel and the first Gaussian noise reduction filter kernel to acquire a convolution filter kernel; determine a weight of the convolution filter kernel according to the SAD of neighborhood luminance values, the shooting scene information and the shooting metadata; multiply the convolution filter kernel by the weight to acquire a sharpness enhancement filter kernel; perform summation on the first Gaussian noise reduction filter kernel and the sharpness enhancement filter kernel to obtain a Gaussian noise reduction sharpening filter kernel; and perform Gaussian noise reduction processing and sharpness enhancement processing on the luminance information according to the Gaussian noise reduction sharpening filter kernel.

Preferably, the processing module 13 may further include a first salt and pepper noise reducing unit 138, where the first salt and pepper noise reducing unit 138 is configured to perform salt and pepper noise reduction processing on the luminance information according to the shooting scene information and the shooting metadata.

The processing module 13 may further include a second salt and pepper noise reducing unit 139, where the second salt and pepper noise reducing unit 139 is configured to, before the second Gaussian noise reducing unit 134 performs local absolute difference calculation according to the chrominance information to acquire the SAD of neighborhood chrominance values of the chrominance information, perform salt and pepper noise reduction processing on the chrominance information according to the shooting scene information and the shooting metadata.

The image processing apparatus provided in the third embodiment of the image processing apparatus of the present invention may be configured to execute the technical solution in the method embodiment shown in FIG. 3A and FIG. 3B, and their implementation principles and technical effect are similar. For details, refer to the related description in the foregoing embodiment, and details are not repeatedly described herein.

Figure 7:
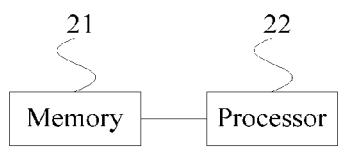
FIG. 7 is a schematic structural diagram of a fourth embodiment of an image processing apparatus according to the present invention.

FIG. 7 is a schematic structural diagram of a fourth embodiment of an image processing apparatus according to the present invention. As shown in FIG. 7, the apparatus in this embodiment includes a memory 21 and a processor 22 connected to the memory 21, where the memory 21 stores a set of program code, and the memory 21 may include a non-volatile memory. The processor 22 may be a central processing unit (CPU) or an application specific integrated circuit ASIC (ASIC), or may be configured as one or multiple integrated circuits for implementing the embodiments of the present invention. The processor 22 is configured to invoke program code stored in the memory 21 and configured to perform the foregoing operations: acquiring a to-be-processed image that is shot but is not image-processed; extracting shooting characteristic information of the to-be-processed image; and performing image processing on the to-be-processed image according to the shooting characteristic information.

Further, the performing image processing on the to-be-processed image according to the shooting characteristic information includes performing noise reduction and/or enhancement processing on the to-be-processed image according to shooting scene information and shooting metadata of the to-be-processed image.

Preferably, the performing noise reduction and/or enhancement processing on the to-be-processed image according to shooting scene information and shooting metadata of the to-be-processed image includes performing noise reduction and/or enhancement processing on luminance information of the to-be-processed image according to the shooting scene information and the shooting metadata; and/or performing noise reduction and/or enhancement processing on chrominance information of the to-be-processed image according to the shooting scene information and the shooting metadata.

Further, the performing noise reduction processing on luminance information of the to-be-processed image according to the shooting scene information and the shooting metadata includes performing local absolute difference calculation on the luminance information to acquire a SAD of neighborhood luminance values of the luminance information; obtaining a first Gaussian noise reduction filter kernel according to the SAD of neighborhood luminance values, the shooting scene information and the shooting metadata; and performing Gaussian noise reduction processing on the luminance information according to the first Gaussian noise reduction filter kernel.

The performing enhancement processing on luminance information of the to-be-processed image includes performing edge-preserving-based filtering decomposition on the luminance information to obtain luminance information of a base layer and luminance information of at least one detail layer; performing contrast enhancement processing on the luminance information of the base layer according to the shooting scene information and the shooting metadata; determining at least one gain according to the SAD of neighborhood luminance values, the shooting scene information and the shooting metadata; performing detail enhancement processing on the luminance information of the detail layer using the gain; and performing summation on the luminance information that is of the base layer and has undergone contrast enhancement processing and the luminance information that is of the detail layer and has undergone detail enhancement processing, so as to obtain the luminance information that has undergone enhancement processing.

Optionally, before the performing enhancement processing on the luminance information, the method further includes multiplying the luminance information that has undergone Gaussian noise reduction processing by a first coefficient $\alpha_1$ to obtain $\alpha_1$ times the luminance information that has undergone Gaussian noise reduction processing, where $\alpha_1$ is a numerical value ranging from 0 to 1; multiplying the luminance information that has not undergone Gaussian noise reduction processing by $(1-\alpha_1)$ to obtain $(1-\alpha_1)$ times the luminance information that has not undergone Gaussian noise reduction processing; and performing summation on the $\alpha_1$ times the luminance information that has undergone Gaussian noise reduction processing and the $(1-\alpha_1)$ times the luminance information that has not undergone Gaussian noise reduction processing, so as to obtain first luminance information.

The performing enhancement processing on luminance information of the to-be-processed image includes performing enhancement processing on the first luminance information.

Further, the performing noise reduction and enhancement processing on luminance information of the to-be-processed image according to the shooting scene information and the shooting metadata includes performing local absolute difference calculation on the luminance information to acquire a SAD of neighborhood luminance values of the luminance information; obtaining a first Gaussian noise reduction filter kernel according to the SAD of neighborhood luminance values, the shooting scene information and the shooting metadata; performing convolution on a high-pass filter kernel and the first Gaussian noise reduction filter kernel to acquire a convolution filter kernel; determining a weight of the convolution filter kernel according to the SAD of neighborhood luminance values, the shooting scene information and the shooting metadata; multiplying the convolution filter kernel by the weight to acquire a sharpness enhancement filter kernel; performing summation on the first Gaussian noise reduction filter kernel and the sharpness enhancement filter kernel to obtain a Gaussian noise reduction sharpening filter kernel; and performing Gaussian noise reduction processing and sharpness enhancement processing on the luminance information according to the Gaussian noise reduction sharpening filter kernel.

Preferably, before the performing local absolute difference calculation on the luminance information to acquire a SAD of neighborhood luminance values of the luminance information, the method further includes performing salt and pepper noise reduction processing on the luminance information according to the shooting scene information and the shooting metadata.

Further, the performing noise reduction processing on chrominance information of the to-be-processed image according to the shooting scene information and the shooting metadata includes performing local absolute difference calculation according to the chrominance information to acquire a SAD of neighborhood chrominance values of the chrominance information; acquiring a second Gaussian noise reduction filter kernel according to the SAD of neighborhood chrominance values, the shooting scene information and the shooting metadata; and performing Gaussian noise reduction processing on the chrominance information according to the second Gaussian noise reduction filter kernel.

The performing enhancement processing on chrominance information of the to-be-processed image according to the shooting scene information and the shooting metadata includes combining the chrominance information and the luminance information to obtain composite image information; acquiring color saturation of the composite image information; and adjusting the color saturation according to the shooting scene information and the shooting metadata.

Optionally, before the combining the chrominance information and the luminance information to obtain composite image information, the method further includes multiplying the luminance information that has undergone enhancement processing by a second coefficient $\alpha_2$ to obtain $\alpha_2$ times the luminance information that has undergone enhancement processing, where $\alpha_2$ is a numerical value ranging from 0 to 1; multiplying the luminance information that has undergone noise reduction processing by $(1-\alpha_2)$ to obtain $(1-\alpha_2)$ times the luminance information that has undergone noise reduction processing; and performing summation on the $\alpha_2$ times the luminance information that has undergone enhancement processing and the $(1-\alpha_2)$ times the luminance information that has undergone noise reduction processing, so as to obtain second luminance information.

The combining the chrominance information and the luminance information to obtain composite image information includes combining the chrominance information and the second luminance information to obtain the composite image information.

Preferably, before the performing local absolute difference calculation according to the chrominance information to acquire a SAD of neighborhood chrominance values of the chrominance information, the method further includes performing salt and pepper noise reduction processing on the chrominance information according to the shooting scene information and the shooting metadata.

It should be noted that, for a technical solution that is implemented by the processor 22 by invoking program code stored in the memory 21, refer to the image processing method embodiments shown in FIG. 1, FIG. 2, FIG. 3A and FIG. 3B in the present invention, and their implementation principles and technical effect are similar. For details, refer to the related description in the foregoing embodiments, and details are not repeatedly described herein.

Figure 8:
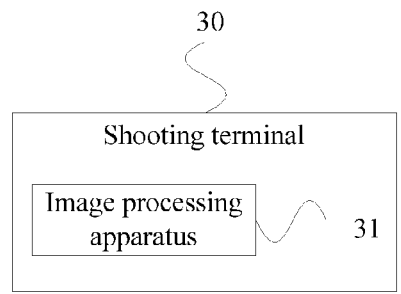
FIG. 8 is a schematic structural diagram of a first embodiment of a shooting terminal according to the present invention.

FIG. 8 is a schematic structural diagram of a first embodiment of a shooting terminal according to the present invention. As shown in FIG. 8, a shooting terminal 30 in this embodiment may include an image processing apparatus 31, where the image processing apparatus 31 may use a structure in any one of the image processing apparatus embodiments shown in FIG. 4 to FIG. 6, and may execute a technical solution of any one of the embodiments shown in FIG. 1 to FIG. 3B correspondingly. Their implementation principles and technical effect are similar. For details, refer to the related description in the foregoing embodiments, and details are not repeatedly described herein.

The shooting terminal 30 may be a mobile phone or a tablet computer, and may also be a device having a shooting lens, such as a notebook computer or a multi-functional player.

Persons of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes any medium that can store program code, such as a read-only memory (ROM), a random access memory (RAM), a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. An image processing method comprising:
    acquiring an image;
    extracting shooting characteristic information from the image;
    performing noise reduction and enhancement processing on luminance information of the image according to shooting scene information and shooting metadata; and
    performing noise reduction and enhancement processing on chrominance information of the image according to the shooting scene information and the shooting metadata,
    wherein performing noise reduction processing on the luminance information of the image comprises:
        performing local absolute difference calculation on the luminance information to acquire a sum of absolute difference (SAD) of neighborhood luminance values of the luminance information;
        obtaining a first Gaussian noise reduction filter kernel according to the SAD of neighborhood luminance values, the shooting scene information, and the shooting metadata; and
        performing Gaussian noise reduction processing on the luminance information according to the first Gaussian noise reduction filter kernel,
    wherein performing enhancement processing on the luminance information of the image comprises:
        performing edge-preserving-based filtering decomposition on the luminance information to obtain luminance information of a base layer and luminance information of at least one detail layer;
        performing contrast enhancement processing on the luminance information of the base layer according to the shooting scene information and the shooting metadata;
        determining at least one gain according to the SAD of neighborhood luminance values, the shooting scene information, and the shooting metadata;
        performing detail enhancement processing on the luminance information of the detail layer using the gain; and
        performing summation on the luminance information that is of the base layer and has undergone contrast enhancement processing and the luminance information that is of the detail layer and has undergone detail enhancement processing, so as to obtain the luminance information that has undergone enhancement processing.

2. The method according to claim 1, wherein before performing enhancement processing on the luminance information of the image, the method further comprises:
    multiplying the luminance information that has undergone Gaussian noise reduction processing by a first coefficient $\alpha 1$ to obtain $\alpha 1$ times the luminance information that has undergone Gaussian noise reduction processing, wherein $\alpha 1$ is a numerical value ranging from 0 to 1;
    multiplying the luminance information that has not undergone Gaussian noise reduction processing by $(1-\alpha 1)$ to obtain $(1-\alpha 1)$ times the luminance information that has not undergone Gaussian noise reduction processing; and
    performing summation on the $\alpha 1$ times the luminance information that has undergone Gaussian noise reduction processing and the $(1-\alpha 1)$ times the luminance information that has not undergone Gaussian noise reduction processing, so as to obtain first luminance information, and wherein performing enhancement processing on luminance information of the image comprises performing enhancement processing on the first luminance information.

3. The method according to claim 1, wherein performing noise reduction processing on the chrominance information of the image comprises:
    performing local absolute difference calculation according to the chrominance information to acquire a SAD of neighborhood chrominance values of the chrominance information;
    acquiring a second Gaussian noise reduction filter kernel according to the SAD of neighborhood chrominance values, the shooting scene information and the shooting metadata; and
    performing Gaussian noise reduction processing on the chrominance information according to the second Gaussian noise reduction filter kernel.

4. The method according to claim 3, wherein performing enhancement processing on the chrominance information of the image according to the shooting scene information and the shooting metadata comprises:
    combining the chrominance information and the luminance information to obtain composite image information;
    acquiring color saturation of the composite image information; and
    adjusting the color saturation according to the shooting scene information and the shooting metadata.

5. The method according to claim 4, wherein before combining the chrominance information and the luminance information, the method further comprises:
    multiplying the luminance information that has undergone enhancement processing by a second coefficient $\alpha 2$ to obtain $\alpha 2$ times the luminance information that has undergone enhancement processing, wherein $\alpha 2$ is a numerical value ranging from 0 to 1;
    multiplying the luminance information, that has undergone noise reduction processing by $(1-\alpha 2)$ to obtain $(1-\alpha 2)$ times the luminance information that has undergone noise reduction processing; and
    performing summation on the $\alpha 2$ times the luminance information that has undergone enhancement processing and the $(1-\alpha 2)$ times the luminance information that has undergone noise reduction processing, so as to obtain second luminance information, and wherein combining the chrominance information and the luminance information to obtain composite image information comprises combining the chrominance information and the second luminance information to obtain the composite image information.

6. The method according to claim 3, further comprising performing salt and pepper noise reduction processing on the chrominance information according to the shooting scene information and the shooting metadata before performing the local absolute difference calculation according to the chrominance information.

7. The method according to claim 1, further comprising performing salt and pepper noise reduction processing on the luminance information according to the shooting scene information and the shooting metadata before performing local absolute difference calculation on the luminance information.

8. An image processing method comprising:
acquiring an image;
extracting shooting characteristic information from the image;
performing noise reduction and enhancement processing on luminance information of the image according to shooting scene information and shooting metadata; and
performing noise reduction and enhancement processing on chrominance information of the image according to the shooting scene information and the shooting metadata,
wherein performing noise reduction and enhancement processing on the luminance information of the image comprises:
performing local absolute difference calculation on the luminance information to acquire a sum of absolute difference (SAD) of neighborhood luminance values of the luminance information;
obtaining a first Gaussian noise reduction filter kernel according to the SAD of neighborhood luminance values, the shooting scene information and the shooting metadata;
performing convolution on a high-pass filter kernel and the first Gaussian noise reduction filter kernel to acquire a convolution filter kernel;
determining a weight of the convolution filter kernel according to the SAD of neighborhood luminance values, the shooting scene information and the shooting metadata;
multiplying the convolution filter kernel by the weight to acquire a sharpness enhancement filter kernel;
performing summation on the first Gaussian noise reduction filter kernel and the sharpness enhancement filter kernel to obtain a Gaussian noise reduction sharpening filter kernel; and
performing Gaussian noise reduction processing and sharpness enhancement processing on the luminance information according to the Gaussian noise reduction sharpening filter kernel.

9. The method according to claim 8, further comprising performing salt and pepper noise reduction processing on the luminance information according to the shooting scene information and the shooting metadata before performing local absolute difference calculation on the luminance information.

10. The method according to claim 8, wherein performing noise reduction processing on the chrominance information of the image comprises:

performing local absolute difference calculation according to the chrominance information to acquire a SAD of neighborhood chrominance values of the chrominance information;
acquiring a second Gaussian noise reduction filter kernel according to the SAD of neighborhood chrominance values, the shooting scene information and the shooting metadata; and
performing Gaussian noise reduction processing on the chrominance information according to the second Gaussian noise reduction filter kernel.

11. The method according to claim 10, wherein performing enhancement processing on the chrominance information of the image according to the shooting scene information and the shooting metadata comprises:
combining the chrominance information and the luminance information to obtain composite image information;
acquiring color saturation of the composite image information; and
adjusting the color saturation according to the shooting scene information and the shooting metadata.

12. The method according to claim 11, wherein before combining the chrominance information and the luminance information, the method further comprises:
multiplying the luminance information that has undergone enhancement processing by a second coefficient $\alpha 2$ to obtain $\alpha 2$ times the luminance information that has undergone enhancement processing, wherein $\alpha 2$ is a numerical value ranging from 0 to 1;
multiplying the luminance information that has undergone noise reduction processing by $(1-\alpha 2)$ to obtain $(1-\alpha 2)$ times the luminance information that has undergone noise reduction processing; and
performing summation on the $\alpha 2$ times the luminance information that has undergone enhancement processing and the $(1-\alpha 2)$ times the luminance information that has undergone noise reduction processing, so as to obtain second luminance information, and wherein combining the chrominance information and the luminance information to obtain composite image information comprises combining the chrominance information and the second luminance information to obtain the composite image information.

13. The method according to claim 10, further comprising: performing salt and pepper noise reduction processing on the chrominance information according to the shooting scene information and the shooting metadata before performing the local absolute difference calculation according to the chrominance information.

14. An image processing apparatus, comprising:
a processor; and
a memory storing instructions, which when executed by the processor, cause the apparatus to:
acquire an image;
extract shooting characteristic information from the image;
perform noise reduction and enhancement processing on luminance information of the image according to shooting scene information and shooting metadata; and
perform noise reduction and enhancement processing on chrominance information of the image according to the shooting scene information and the shooting metadata, wherein instructions causing the apparatus to perform noise reduction processing on the luminance information of the image comprise instructions causing the apparatus to:
  perform local absolute difference calculation on the luminance information to acquire a sum of absolute difference (SAD) of neighborhood luminance values of the luminance information;
  obtain a first Gaussian noise reduction filter kernel according to the SAD of neighborhood luminance values, the shooting scene information, and the shooting metadata; and
  perform Gaussian noise reduction processing on the luminance information according to the first Gaussian noise reduction filter kernel,
wherein instructions causing the apparatus to perform enhancement processing on the luminance information of the image comprise instructions causing the apparatus to:
  perform edge-preserving-based filtering decomposition on the luminance information to obtain luminance information of a base layer and luminance information of at least one detail layer;
  perform contrast enhancement processing on the luminance information of the base layer according to the shooting scene information and the shooting metadata;
  determine at least one gain according to the SAD of neighborhood luminance values, the shooting scene information, and the shooting metadata;
  perform detail enhancement processing on the luminance information of the detail layer using the gain; and
  perform summation on the luminance information that is of the base layer and has undergone contrast enhancement processing and the luminance information that is of the detail layer and has undergone detail enhancement processing, so as to obtain the luminance information that has undergone enhancement processing.

15. The apparatus according to claim 14, wherein before performing enhancement processing on the luminance information of the image, the instructions further cause the apparatus to:
  multiply the luminance information that has undergone Gaussian noise reduction processing by a first coefficient α1 to obtain α1 times the luminance information that has undergone Gaussian noise reduction processing, wherein α1 is a numerical value ranging from 0 to 1;
  multiply the luminance information that has not undergone Gaussian noise reduction processing by (1−α1) to obtain (1−α1) times the luminance information that has not undergone Gaussian noise reduction processing; and
  perform summation on the α1 times the luminance information that has undergone Gaussian noise reduction processing and the (1−α1) times the luminance information that has not undergone Gaussian noise reduction processing, so as to obtain first luminance information, and wherein performing enhancement processing on luminance information of the image comprises performing enhancement processing on the first luminance information.

16. The apparatus according to claim 14, wherein instructions causing the apparatus to perform noise reduction processing on the chrominance information of the image comprise instructions causing the apparatus to:
  perform local absolute difference calculation according to the chrominance information to acquire a SAD of neighborhood chrominance values of the chrominance information;
  acquire a second Gaussian noise reduction filter kernel according to the SAD of neighborhood chrominance values, the shooting scene information and the shooting metadata; and
  perform Gaussian noise reduction processing on the chrominance information according to the second Gaussian noise reduction filter kernel.

17. The apparatus according to claim 16, wherein instructions causing the apparatus to perform enhancement processing on the chrominance information of the image according to the shooting scene information and the shooting metadata comprise instructions causing the apparatus to:
  combine the chrominance information and the luminance information to obtain composite image information;
  acquire color saturation of the composite image information; and
  adjust the color saturation according to the shooting scene information and the shooting metadata.

18. The apparatus according to claim 17, wherein before combining the chrominance information and the luminance information, the instructions further cause the apparatus to:
  multiply the luminance information that has undergone enhancement processing by a second coefficient α2 to obtain α2 times the luminance information that has undergone enhancement processing, wherein α2 is a numerical value ranging from 0 to 1;
  multiply the luminance information that has undergone noise reduction processing by (1−α2) to obtain (1−α2) times the luminance information that has undergone noise reduction processing; and
  perform summation on the α2 times the luminance information that has undergone enhancement processing and the (1−α2) times the luminance information that has undergone noise reduction processing, so as to obtain second luminance information, and wherein combining the chrominance information and the luminance information to obtain composite image information comprises combining the chrominance information and the second luminance information to obtain the composite image information.

19. The apparatus according to claim 16, wherein the instructions further cause the apparatus to perform salt and pepper noise reduction processing on the chrominance information according to the shooting scene information and the shooting metadata before performing the local absolute difference calculation according to the chrominance information.

20. The apparatus according to claim 14, wherein the instructions further cause the apparatus to perform salt and pepper noise reduction processing on the luminance information according to the shooting scene information and the shooting metadata before performing local absolute difference calculation on the luminance information.

* * * * *